(12) United States Patent
Laughlin

(10) Patent No.: US 7,831,063 B2
(45) Date of Patent: Nov. 9, 2010

(54) SMALL EVENT DETECTOR IN PRESENCE OF CLUTTER

(76) Inventor: Richard H. Laughlin, 2100 Dove Loop Rd., Lot 41, Grapevine, TX (US) 76051-4944

( * ) Notice: Subject to any disclaimer, the term of this patent is extended or adjusted under 35 U.S.C. 154(b) by 934 days.

(21) Appl. No.: 11/676,380

(22) Filed: Feb. 19, 2007

(65) Prior Publication Data

US 2008/0198094 A1    Aug. 21, 2008

(51) Int. Cl.
*G06K 9/00* (2006.01)
(52) U.S. Cl. ............. 382/103; 382/100; 382/173; 348/143; 348/152; 348/153; 348/154; 348/155
(58) Field of Classification Search ............. None
See application file for complete search history.

(56) References Cited

U.S. PATENT DOCUMENTS

| 4,970,605 | A | * | 11/1990 | Fogaroli et al. | ............. 358/461 |
| 5,313,533 | A | * | 5/1994 | Scott | ............. 382/273 |
| 6,542,621 | B1 | * | 4/2003 | Brill et al. | ............. 382/103 |
| 7,263,208 | B1 | * | 8/2007 | Crosby et al. | ............. 382/103 |
| 2005/0163345 | A1 | * | 7/2005 | van den Bergen et al. | ... 382/103 |
| 2005/0163346 | A1 | * | 7/2005 | van den Bergen et al. | ... 382/103 |

OTHER PUBLICATIONS

Bo et al. (A Quick Self-Adaptive Background Updating Algorithm Based on Moving Region, Proceedings of the 2006 Joint Conference on Information Sciences, JCIS 2006, Kaohsiung, Taiwan, ROC, Oct. 8-11, 2006).*
Richard H. Laughlin, "System and Method for Detecting Real-Time Change in an Image" U.S. Appl. No. 11/228,182, filed Sep. 16, 2005.

* cited by examiner

*Primary Examiner*—Sath V Perungavoor
*Assistant Examiner*—Jason Heidemann

(57) ABSTRACT

A system and method for displaying a plurality of images. In one embodiment, the system includes: (1) an event detector configured to detect at least one true target in the plurality of images using a threshold based on average and peak pixel values, (2) an image processor configured to define at least one corresponding region-of-interest for the at least one true target, (3) at least one display configured to display the plurality of images on at least one display and (4) a region-of-interest display separate from the at least one display and configured to display the at least one region-of-interest.

20 Claims, 14 Drawing Sheets

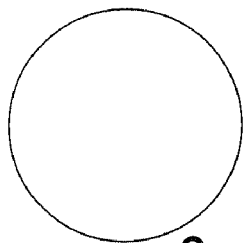 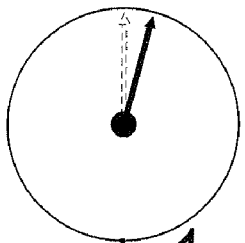 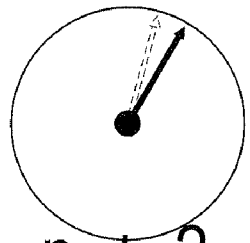
n + 0     n + 1     n + 2
Figure 4a   Figure 4b   Figure 4c
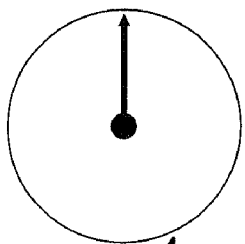 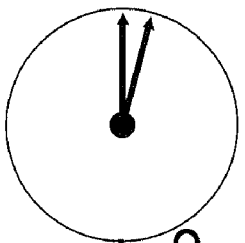 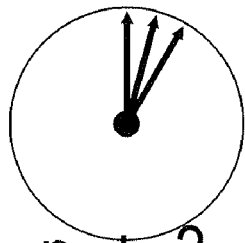
n + 1     n + 2     n + 3
Figure 5a   Figure 5b   Figure 5c
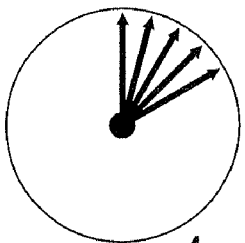 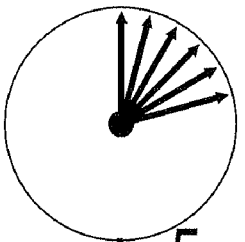 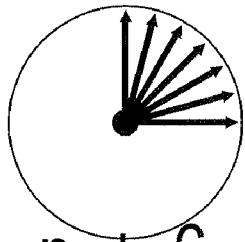
n + 4     n + 5     n + 6
Figure 5d   Figure 5e   Figure 5f

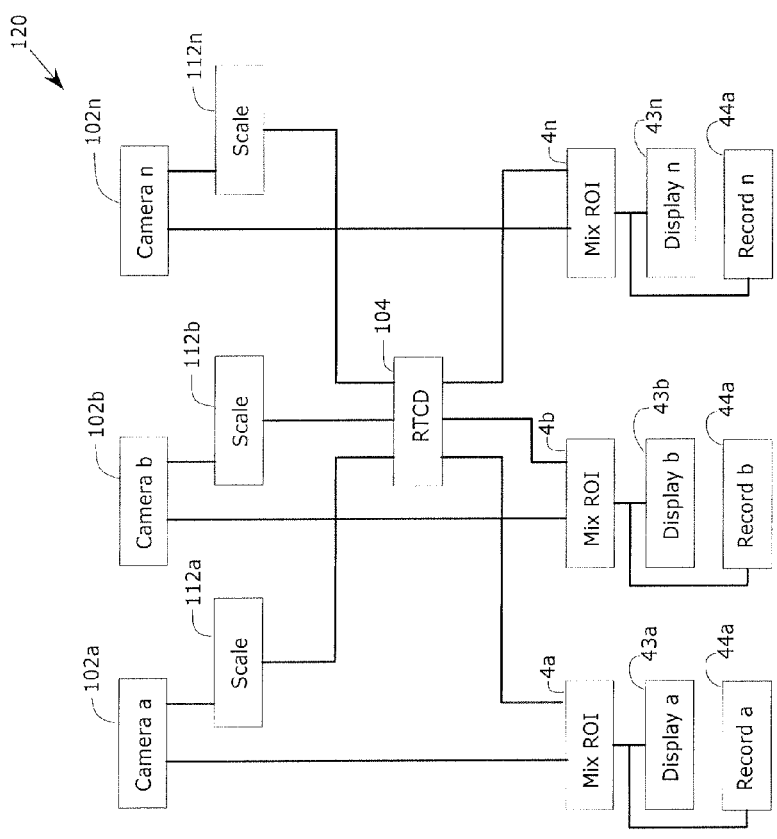
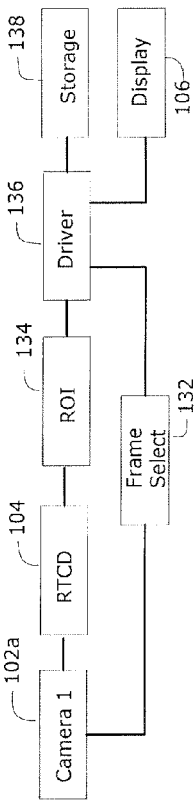
Figure 11
Figure 12

CHANGE DETECTION

SMALL EVENT DETECTOR IN PRESENCE OF CLUTTER

CROSS-REFERENCE TO RELATED APPLICATION

This application is related to U.S. patent application Ser. No. 11/228,182, filed on Sep. 16, 2005, by Laughlin, entitled "System and Method for Detecting Real-Time Change in an Image," commonly owned with this application and incorporated herein by reference.

TECHNICAL FIELD OF THE INVENTION

The invention is directed, in general, to moving image capture and display systems and, more particularly, to a system and method, capable of implementation in a processor, such as a digital signal processor (DSP), for detecting real-time events in an image.

BACKGROUND OF THE INVENTION

Video surveillance is being used more and more today. A problem arises when an operator observer has been viewing a monitor for a significant period of time or a group of monitors. When there has been no change in a monitor for a period of time, the observer loses his attention to detail and eventually the image, that he expects to see is burned into his mind. A second issue arises when the observer is required to view a plurality of monitors. Only one scene, monitor, may be changing but the operator must check all monitors to ensure there is not a true target in that scene. If the observer can make a quick glance at the other monitors and determine that there is no cue and thus no new true target or true target motion then a greater time can be spent dwelling on the scene that is changing. It is also well documented that the probability of detection, recognition and identification is dependent upon the time studying the image.

There have been a multitude of schemes proposed to address this issue based on a variation in the scene. Unfortunately, none of these schemes takes into account the power of the human observer. The human mind connected to the eye is one of the most powerful computers known. It can interpolate data based on history. It can reject false alarms based on similar patterns. It can identify true targets based on patterns and changes in patterns. It can interpolate missing pieces of data. The problem is that the mind gets bored when there are none of the above functions to perform.

Accordingly, what is needed in the art is a system and method capable of implementation in a processor, such as a DSP, for detecting real-time change in an image that takes advantage of the image-processing power of the human mind.

SUMMARY OF THE INVENTION

To address the above-discussed deficiencies of the prior art, the invention provides, in one aspect, a system for displaying a plurality of images. In one embodiment, the system includes: (1) an event detector configured to detect at least one true target in the plurality of images using a threshold based on average and peak pixel values, (2) an image processor configured to define at least one corresponding region-of-interest for the at least one true target, (3) at least one display configured to display the plurality of images on at least one display and (4) a region-of-interest display separate from the at least one display and configured to display the at least one region-of-interest.

In another aspect, the invention provides a method of displaying a plurality of images. In one embodiment, the method includes: (1) detecting at least one true target in the plurality of images using a threshold based on average and peak pixel values, (2) defining at least one corresponding region-of-interest for the at least one true target and (3) displaying the plurality of images on at least one display and the at least one region-of-interest on a region-of-interest display separate from the at least one display.

The foregoing has outlined preferred and alternative features of the invention so that those skilled in the pertinent art may better understand the detailed description of the invention that follows. Additional features of the invention will be described hereinafter that form the subject of the claims of the invention. Those skilled in the pertinent art should appreciate that they can readily use the disclosed conception and specific embodiment as a basis for designing or modifying other structures for carrying out the same purposes of the invention. Those skilled in the pertinent art should also realize that such equivalent constructions do not depart from the scope of the invention.

BRIEF DESCRIPTION OF THE DRAWINGS

For a more complete understanding of the invention, reference is now made to the following descriptions taken in conjunction with the accompanying drawing, in which:

FIGS. 4A-4C together illustrate the provision of a differential image involving the subtraction of two images;

FIG. 5A-5F together illustrate differential images resulting from subtraction of a plurality of images;

FIG. 11 illustrates a flow diagram of one embodiment of a method for optimizing the processing bandwidth;

FIG. 12 illustrates the concept of region-of-interest (ROI) compression;

DETAILED DESCRIPTION

One aspect of the invention is a video processing and display system configured such that it can indicate to an observer that a change has occurred in an image and where in the image the change may be found. It is known that the smaller the image area, and the fewer number of confusing objects, the more rapidly true target recognition and identification occur. The detector that initially captures the image includes an imaging unit that receives incident light on an array of pixel elements provides a digital output corresponding to the incident light thereby generating a digital output signal. The imaging apparatus compares sequential pixel output signals from a single pixel, and generates a differential signal which forms an image of the difference between the present image and previous image(s). The present image and the differential image(s) are added together such that the differential image when presented to the observer cues the observer where the change(s) in the image/scene is occurring.

Because image signals and differential signals are generated simultaneously, and the magnitude of the differential signals can be varied based on the operator's judgment of the optimum contrast between the real time image and the differential signal, and various types of signal processing of the differential signal can be performed easily, the operator can optimize the image for cueing. A simple linear amplifier may be used for a uniform gain or a log amplifier may be used to emphasize small differential changes, by compressing the larger changes. In addition, the processing of the differential signal may include processing each of the red-green-blue (RGB) colors separately and differently. In the illustrated embodiment, a digital filter that enhanced the outline of the differential image is used to cue the operator to study that area of the image.

In the normal surveillance mode, the real time image is presented to the operator, and the differential signals are added (mixed) with the video signal. In the illustrated embodiment, the mixing is accomplished at the camera and only one signal is transmitted to the display. However, it may be desirable to transmit both the image signal and the difference signal to the display independently and mix the signals at the display to facilitate the operator adjustment of the processing of the difference signal.

Figure 1:
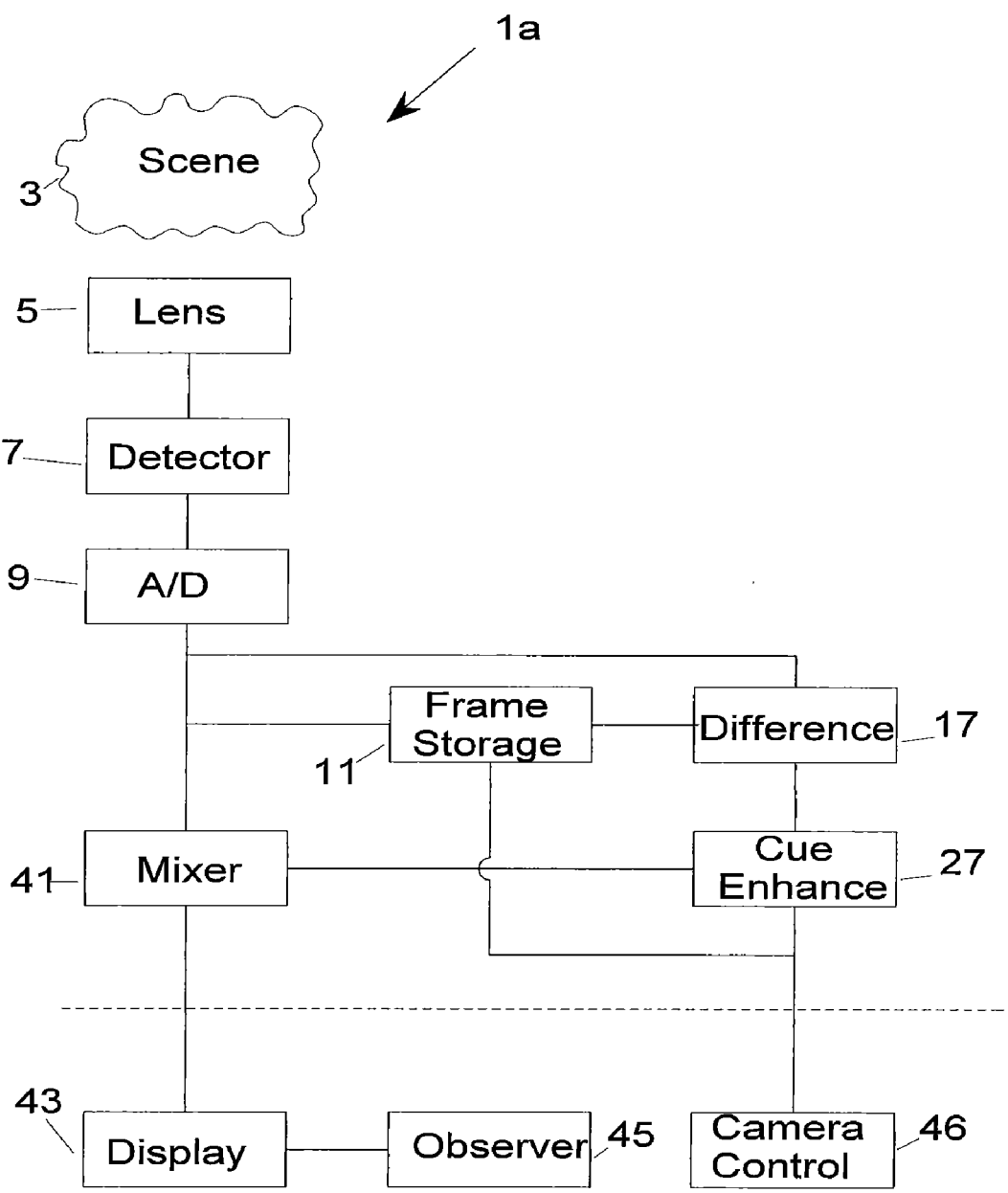
FIG. 1 illustrates a block diagram of one embodiment of a video processing and display system and a method of capturing and displaying video constructed and carried out according to the principles of the invention.

Referring initially to FIG. 1, illustrated is a block diagram of one embodiment of a video processing and display system and a method of capturing and displaying video constructed and carried out according to the principles of the invention.

The illustrated video processing and display system processes a digital video stream so as to extract a differential signal between frames of a digital video stream to process that signal and mix it back with the real-time digital video stream. The highlighted differential signal (image) is used to cue the operator that there has been a change in the scene and where that change has taken place. In the illustrated embodiment, the video processing and display system is an integral part of a digital imaging system. However, those skilled in the pertinent art will recognize that the change detector circuitry can be an onboard addition to a digital imaging system or an outboard unit that accepts the video in the various formats transmitted from the imaging system and processes the video signal to perform the change detection.

One illustrated embodiment of the video processing and display system compares the present video frame to a previous video frame. The illustrated video processing and display system then forms an image of the scene and simultaneously a differential image, of the change in the scene. When no change or only nominal change has occurred, there is essentially no image. When a change has occurred between the current frame and a previous reference frame, there is a positive image of the new true target at its new position and a negative image of where the true target was previously. This image is then mixed with the scene image and displayed to an operator.

In the illustrated embodiment, the difference signal is enhanced and the signal is processed by a digital filter so that the outline of the image is enhanced. The signal is then clipped to eliminate the negative image so that only the new position of the true target is presented. Those skilled in the pertinent art will recognize that it may be beneficial in some operating conditions to clip the positive portion of the signal.

The present frame is compared to the six preceding frames in one illustrated embodiment. However, it may be advantageous to compare the present frame to a single earlier frame, or to processes and mix a plurality of difference signals (images) from a plurality of previous frames depending on the anticipated nature of the change and the speed of the change of the scene. One skilled in the pertinent art will also recognize that in some cases it may be desirable to selectively compare a plurality of frames other than all of the i-k frames.

FIG. 1 illustrates a lens 5 imaging a scene 3 onto a detector 7. In the illustrated embodiment, the detector 7 is a monochrome CCD camera. The analog output of the detector 7 focal plane array is processed by an analog-to-digital converter 9, which results in a digital video stream. The output of each pixel, in response to the intensity of the scene 3 at that point on the detector, is then represented by a binary number. In the illustrated embodiment, an 8-bit word is clocked out a serial port. This output is sent directly to a mixer 41, as the current frame, digital video stream and simultaneously to both the frame storage circuit 11 where the current frame and previous frames are stored, delayed and sent to the differencing unit 17. The frame storage circuit 11 stores each frame for a set number of frames to which is then passed on to the difference circuit 17 where they are differenced with current frame. The output of the difference circuit 17 is a new image of the change, only now placed in context in the scene. The location of the true target in the previous frame(s) is represented by a negative image, and its present location is represented by a positive image. The output of the difference circuit 17 is passed to a cue image enhancement circuit 27. The cue image enhancement circuit 27 optimizes the difference image for operator cuing.

Those skilled in the pertinent art will recognize that the video processing and display system can operate without the cue image enhancement circuit 27. The enhanced difference image, at the output of the cue image enhancement circuit 27 is combined with the video image, of the present frame, from the output of the analog-to-digital converter 9 in the mixer 41.

The two combined images, the present video image and the enhanced difference image, are transmitted by a transmitter 49a to the display 43 for presentation to the observer 45. In the illustrated embodiment, the transmitter 49a is a composite video cable. An observer 45 controls the cue image enhancement circuit 27 features and the frame storage circuit 11, by way of a control 46. The control 46 is connected to the frame storage circuit 11 and the cue image enhancement circuit 27 by a second transmitter 49c. In the illustrated embodiment this is a control cable. Those skilled in the pertinent art will recognize that cables 49c and 49a can be any way of transmitting signals including a wireless link.

Figure 2:
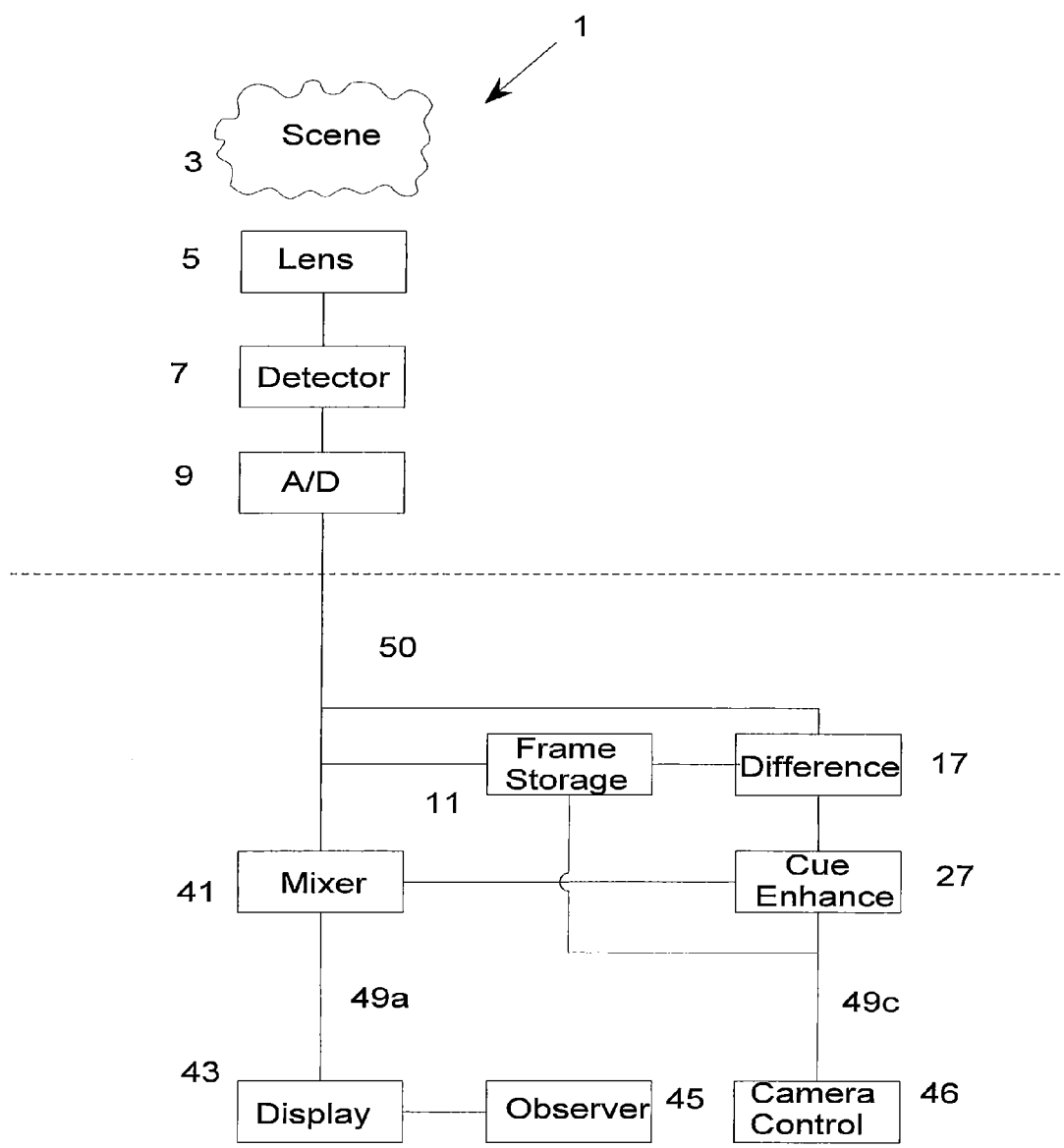
FIG. 2 illustrates a block diagram of another embodiment of a video processing and display system and a method of capturing and displaying video constructed and carried out according to the principles of the invention.

It should be recognized that the demarcation point for the transmitter 49 between the detector 7 and the remote display 43 may occur at different places in the system. Turning now to FIG. 2, illustrated is a block diagram of another embodiment of a video processing and display system and a method of capturing and displaying video constructed and carried out according to the principles of the invention. In this embodiment the demarcation point for the transmitter 50 is the output of the real time frame from the analog-to-digital converter 9. The transmitter 51 transmits the digital signal to the mixer 41, the frame storage circuit 11 and the difference circuit 17. This facilitates an independent control, by the operator, that can be inserted between a camera and its display.

Figure 3:
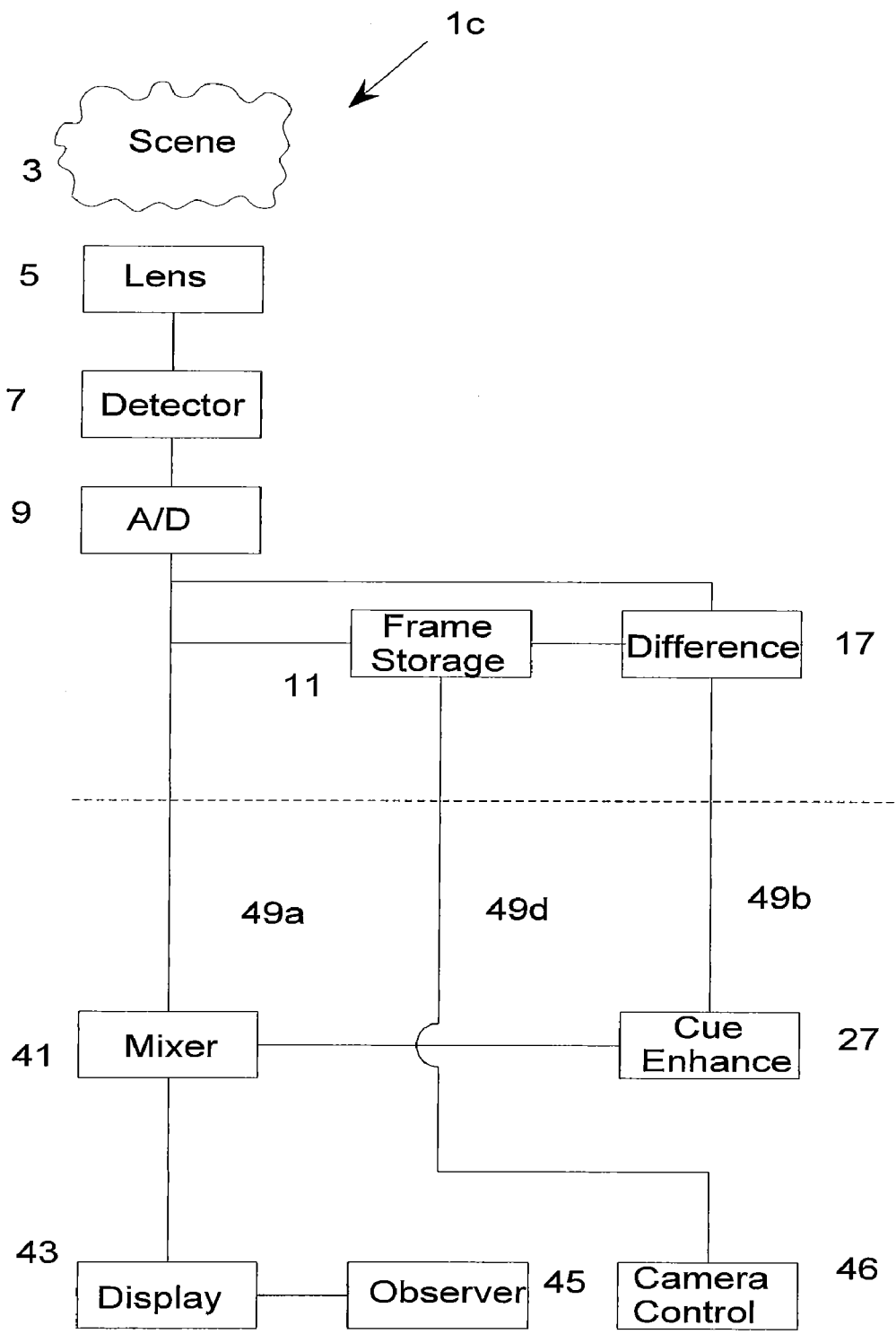
FIG. 3 illustrates a block diagram of yet another embodiment of a video processing and display system and a method of capturing and displaying video constructed and carried out according to the principles of the invention.

Turning now to FIG. 3, illustrated is another option with a differing demarcation point, for the embodiment of the illustrated video processing and display system 1c. In this case, the point of demarcation for the remote display is after the analog-to-digital converter 9 and the difference circuit 17. The signal from the analog-to-digital converter 9 is transmitted by the transmitter 49a to the remote mixer 41. The signal from the difference circuit 17 is transmitted by a second transmitter 49c to the cue image enhancement circuit 27, and the signal from control 46 is transmitted by a third transmitter 49b to the frame storage circuit 11.

Turning now to FIGS. 4A-C, illustrated are the provisions of a differential image involving the subtraction of two images. The human eye has a nominal response time of 60 milliseconds. As a result typical frame times of video systems are 30 frames/second (33 milliseconds) such that the display 43 does not appear to flicker to the observer 45. If the device only compares the nth frame to the n−1 frame, in some cases the observer 45 may not notice the cue. FIGS. 4A, 4B and 4C illustrate the difference image of a clock hand moving 15° per frame when comparing only two frames. At time "0," shown in FIG. 4A, there would be no image as a result of no change. At time "0" plus 1 frame n+1, there is a negative image where the hand was and a positive image where the hand is at n+1, as shown in FIG. 4B. FIG. 4C at time "0" plus two frames, n+2, shows a negative image where there was a positive image at n+1 and a new positive image in the new position. These images, with the proper intensity settings, can result in a subtle but detectible presentation. If there were sufficient brightness compared to the rest of the scene, it could amount to a cue to the presence of a change.

Turning now to FIGS. 5A-5F, illustrated are differential images resulting from subtraction of a plurality of images. In this embodiment, one of the differential images is clipped. In the illustrated embodiment, it is the negative image. The nth frame is delayed k field times, where k can take on a plurality of values. The nth frame is then differenced with all n−1, n−2, ... n−k values. These differenced images are clipped to remove the negative image and summed together. In the first frame, there would be a single image FIG. 5A. At k=6 there would be six images. In the steady state environment of one embodiment, each image would remain on the screen for 0.2 minutes with one setting of k. One skilled it the art will realize that it is advantageous to provide a control to set the value of k. In some cases, it might be advantageous to drop out a plurality of frames such that all of the frames from 1 to k are not summed.

Figure 6:
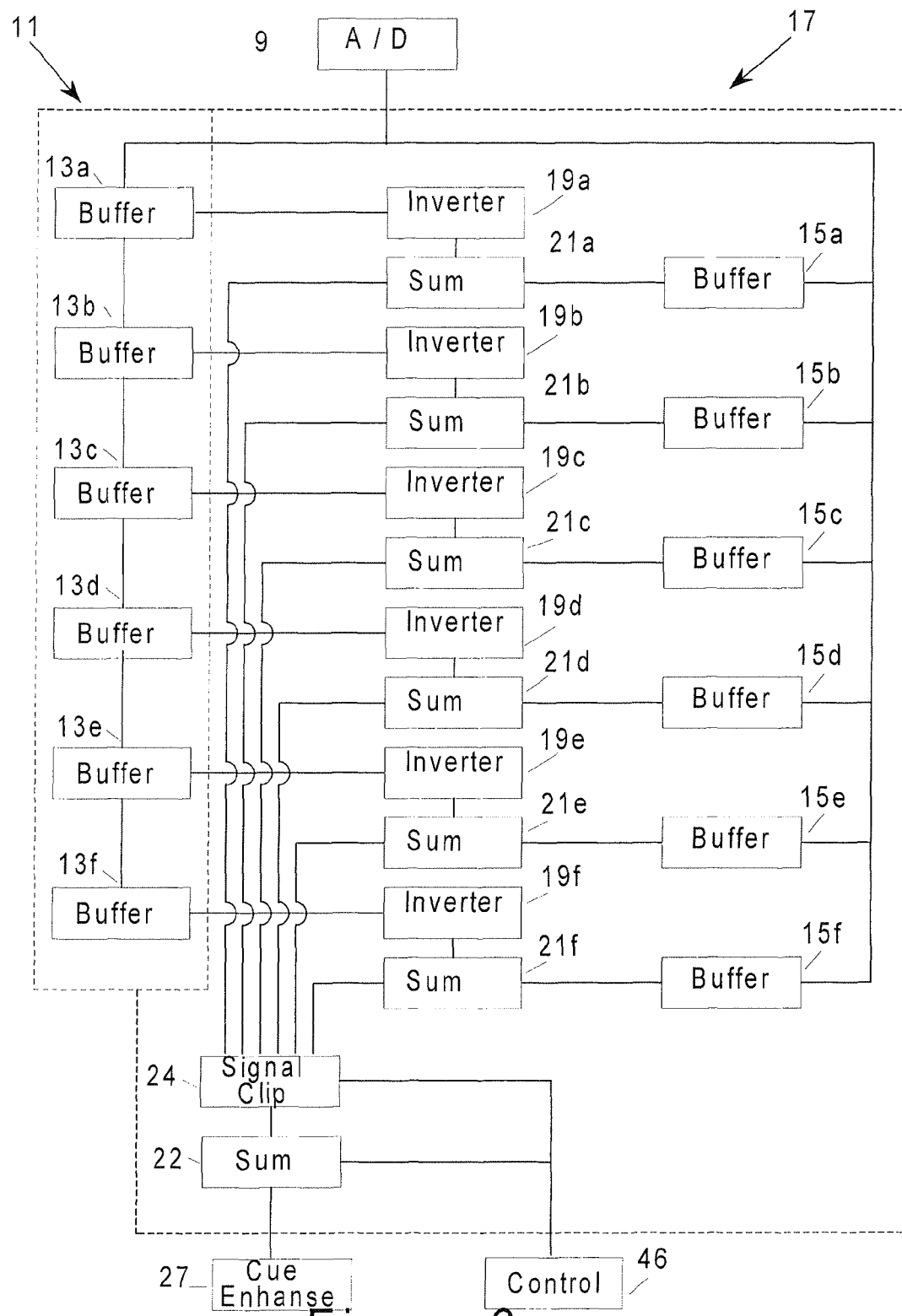
FIG. 6 illustrates a block diagram of one embodiment of an exemplary frame storage and difference circuit.

Turning now to FIG. 6, illustrated is a block diagram of one embodiment of an exemplary frame storage and difference circuit. The signal coming from the analog-to-digital converter 9 is split and sent to the first buffer 13a of the frame storage circuit 11 and all of the buffers 15a through 15k of the difference circuit 17. In the illustrated embodiment, the buffers 15a-f receive frame n−0 simultaneously with the buffer 13a, as they are clocked out of the camera. Each buffer 13a-f is constructed such that it provides a delay of 1 frame. Such that the output of buffer 13a presents the frame from the time n−0, buffer 13b presents the frame from time n−1 repeating this pattern to buffer 13k presents the frame from the time n−k. The output of buffer 13a also presents the video frame to buffer 13b delayed one frame. The output of buffer 13b also presents its output to buffer 13c delayed by one frame for the output of buffer 13a and two frames from the input of buffer 13a. In like manor buffer 13k receives the output of 13(k−1) delayed k frames from the input of buffer 13a. One skilled in the pertinent art will recognize that the buffers 13 can be configured with delays corresponding to various numbers of frames, or partial frames. They could configure to delay by individual pixels or individual lines of the detector 7.

The buffers 15a-k delay the incoming frame by the inverter delay such that the first pulse of frame n arrives at the sum circuits 21a-k at the same time as the first pulse of frame n−k from the inverter 19. The output of the inverters 19a-k (frame n−1 through n−k, respectively) is presented to the sum circuits 21a-k where frame n is differenced with frame n−1 through frame n−k. The output of the sum circuits 21a-k is then simultaneously presented to a clipping circuit 24, where all of the negative components of the differential image are clipped (removed). The control signal can configure the clipping circuit 24 such that the positive components of the differential image are clipped so as to optimize the cueing. Each of the k clipped and delayed differential images at the output of the clip circuit 24 are transferred to a summing circuit 22, where all k frames are added together for a composite change image over time frame n−1 through n−k. A control signal is provide from the operator control 46 to select which frames n−1 to n−k will be summed and used as the cueing image.

Figure 7:
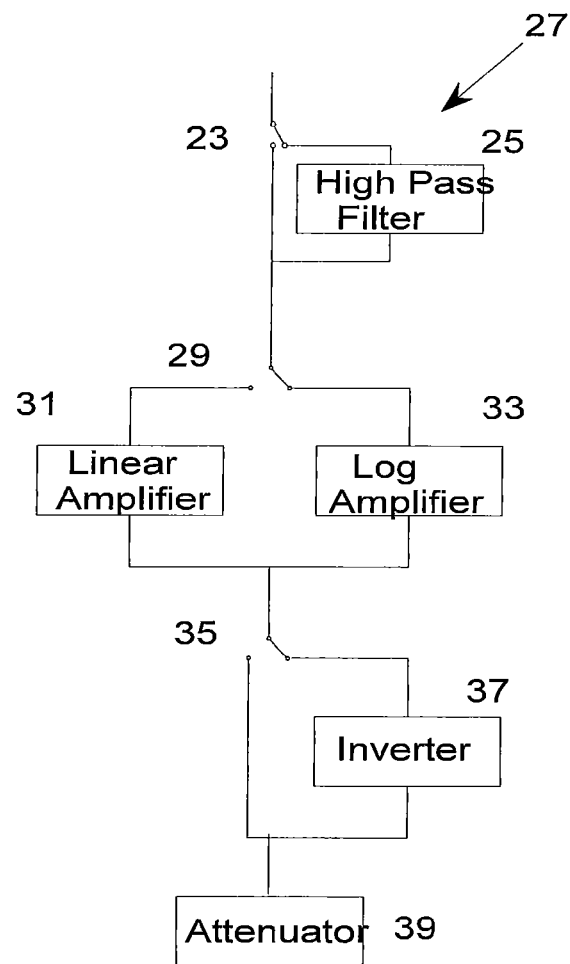
FIG. 7 illustrates a block diagram of one embodiment of an exemplary cue enhancement circuit.

Turning now to FIG. 7, illustrated is a block diagram of one embodiment of an exemplary cue image enhancement circuit 27. While a cue image enhancement circuit 27 is not essential to the operation of the video processing and display system, the cue image enhancement circuit 27 allows the operator to enhance the cueing function such that an operator detects a change in the scene more rapidly. The composite of the delayed differential images from summing circuit 22 is presented to the cue image enhancement circuit 27. It first may be passed through a digital filter 25 to highlight the edges or boundary of the differential image.

Note that some embodiments may incorporate a digital filter on each individual delayed differential image prior to summing the individual images. A selector switch 23 allows the operator to select or deselect the digital filter. Other specific filters may be added to enhance the outline of the change. The differential images are then passed through either a linear amplifier 31 or a log amplifier 33 selected by switch 29. The log amplifier 33 is used to emphasize the larger (more intense) changes in the image. The operator can also select using the selector switch 35 the use of the inverter 37 to optimize the contrast of the cue image with the real time image. The final element in the illustrated embodiment of the cue image enhancement circuit 27 is an attenuator 39 to balance the intensity of the cue (differential images) with the real time image. One skilled in the pertinent art will recognize that the order of processing elements can be rearranged or one or more of the elements can be eliminated and that there may be other functions that can be added to the cue image enhancement circuit 27 that would in specific scenes enhance the cueing function.

Figure 8:
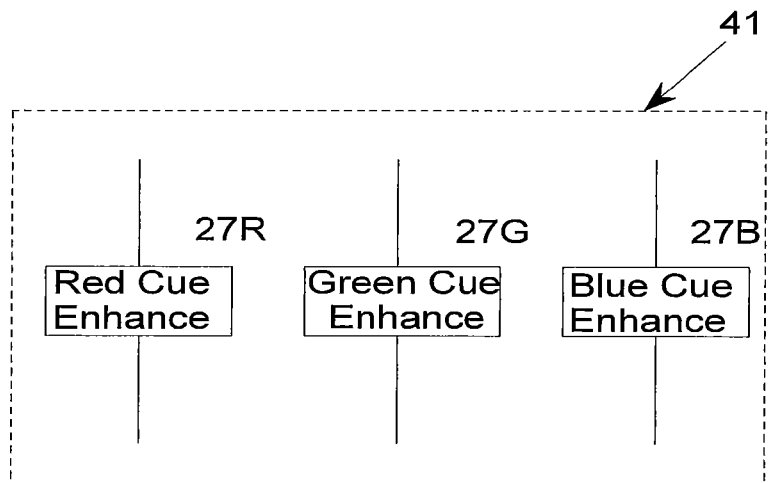
FIG. 8 illustrates a block diagram of one embodiment of an exemplary color enhancement circuit.

Turning now to FIG. 8, illustrated is a block diagram of one embodiment of an exemplary color enhancement circuit 47. The illustrated color enhancement circuit 47 incorporates three cue enhancement circuits 27 one for each of the three primary colors, red cue enhancement 27R, green cue enhancement 27G and blue cue enhancement 27B and adds a color balance 40. This provides the operator the ability to process each of the colors separately to enhance the cueing. Those skilled in the pertinent art will recognize that there may be other color combinations that can be used to enhance the cue or that conventional color balance and saturation circuits can be incorporated into the cue enhancement circuit 27.

FIGS. 6, 7 and 8 describe a flexible embodiment where the operator can optimize the cueing of the illustrated video processing and display system. In specific applications, it may be advantageous to pre-select the specific embodiment and eliminate the unused portions of the circuitry.

Figure 9:
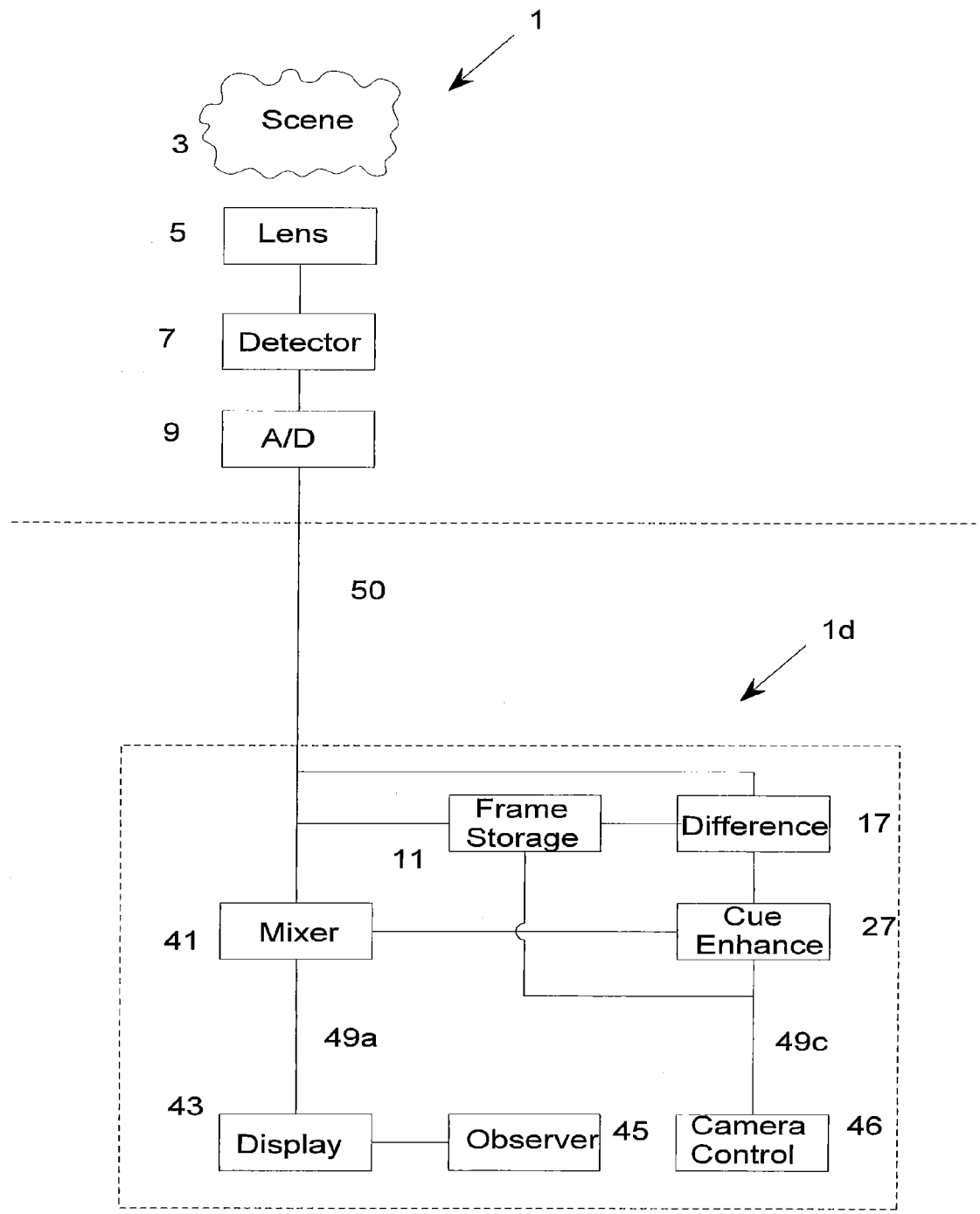
FIG. 9 illustrates a block diagram of one embodiment of a software-based video processing and display system and a method of capturing and displaying video constructed and carried out according to the principles of the invention.

Turning now to FIG. 9, illustrated is a block diagram of one embodiment of a software-based video processing and display system and a method of capturing and displaying video constructed and carried out according to the principles of the invention. More specifically, FIG. 9 shows a illustrated video processing and display system where the digitized video output of the detector 7 (camera) is provided to a computer (microprocessor) 52 and the hardware (hard-wired) frame storage circuit 11, difference 17, cue enhancement 27, mixer 41 described in FIGS. 6, 7 and 8 functions are accomplished, in software, by algorithms with in the computer 52.

Another aspect of the invention is a method for processing video to emphasize an event (the appearance of a true target in a scene) and deemphasize events not of interest. The method may include reading a present (most recent) video frame, storing the present frame as a reference, forming a difference frame by subtracting the reference frame from the present frame (perhaps where the reference frame is a previous frame or an average of a plurality of previous frames), storing the average of each pixel from a plurality of previous difference frames, storing the peak values of each pixel from a plurality of previous frames, subtracting a reference frame which is a combination of the peak and average pixel values of previous differentials from the present differential frame to yield a second differential frame, converting the resulting second differential frame to a binary frame and processing the binary frame to tag the events. The binary frame may be processed to extract the coordinates. The coordinates may be used to define the location of an ROI. The coordinates may be compared to previous coordinates of previous ROIs.

The ROI may be highlighted and combined with the present frame. The ROI may be magnified and combined with the present frame. The highlight may be a geometric shape encircling the ROI. The highlight may be an intensified ROI. The highlight may be a symbol representing the ROI. The event tag may then be combined with the present frame for display or storage.

Yet another aspect of the invention is a method for processing video to emphasize an event and deemphasize events not of interest. The method may include reading the present video frame, equalizing storing the average of each pixel from a plurality of previous difference frames, storing the peak values of each pixel from a plurality of previous frames, subtracting a reference frame which is a combination of the peak and average pixel values of previous frames from the present frame, converting the resulting differential frame to a binary frame and processing the binary frame to tag those events. The binary frame may be processed to extract the coordinates. The coordinates may be used to define the location of the ROI. The coordinates may be compared to previous coordinates of previous ROIs. The ROI may be highlighted and combined with the present frame.

The ROI may be magnified and combined with the present frame. The highlight may be a geometric shape encircling the ROI. The highlight may be an intensified ROI. The highlight may be a symbol representing the ROI. The event tag may be combined with the frame of the present frame for display or storage.

Figure 10:
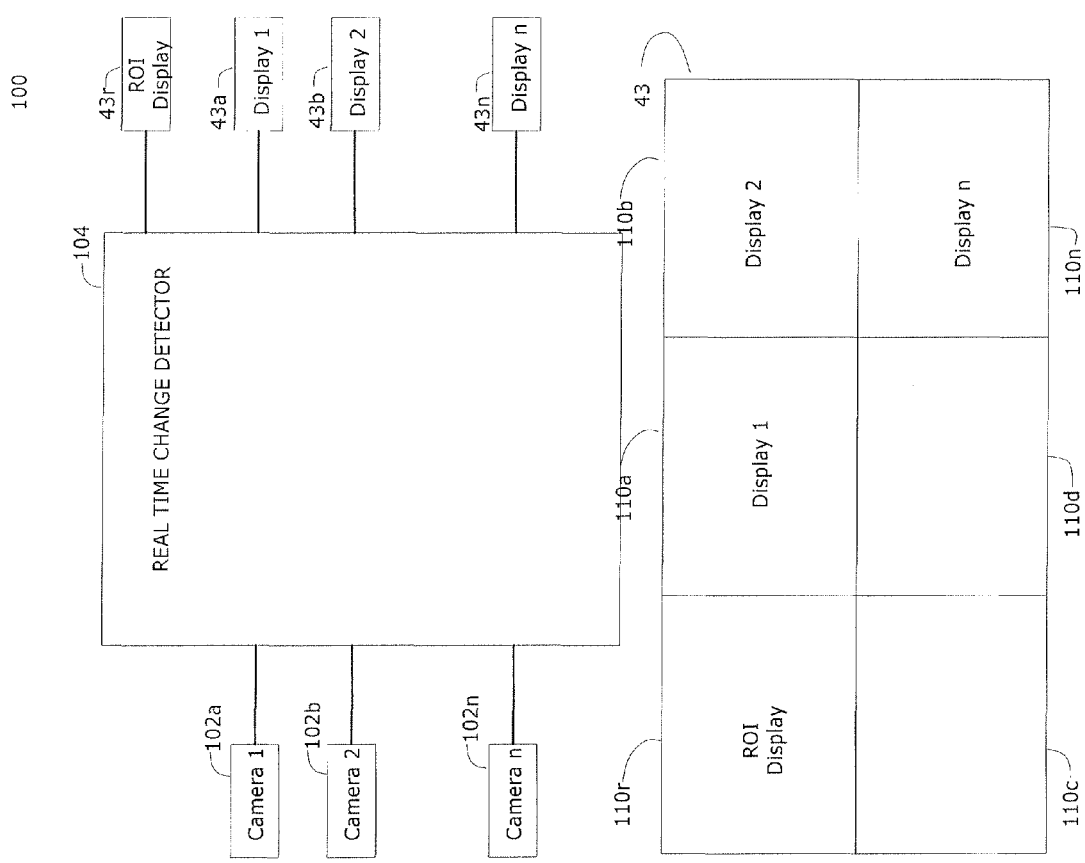
FIG. 10 illustrates a block diagram an embodiment of a portion of the system of FIG. 9 that includes a processor configured to receive inputs from a plurality of cameras.

FIG. 10 presents an embodiment 100 of a system 104 embodying some or all of the above-described functions where a processor receives inputs from a plurality of cameras 102. The plurality of processed images with their highlighted ROI are displayed on individual displays 43a, ... 43n and the magnified ROI from the plurality of cameras 102a, ... 102n are displayed on a common ROI Display 43r.

In a related embodiment, the plurality of processed images may be displayed on a display 43 where each camera's processed image with its highlighted ROI is assigned a sector to display 110a, ... 110n, with one sector being reserved for display 110r of the common magnified ROI.

FIG. 11 presents a method for optimizing the processing bandwidth 120. The true target detection of the system 104 may be computationally intensive but, to be useful for real-time applications, should be performed in real-time. The quality of the image may be substantially preserved while reducing the number of pixels to be processed by scaling 112 the image from the plurality of cameras 102 and processing them by a single system 104, mixing the ROI 4a, ... 4n with the unscaled image and displaying them on their respective displays 43a, ... 43n.

With the growing numbers of images and the associated increase in bandwidth required for transmission of these images there may be a great emphasis on reducing bandwidth. Many compression schemes have been developed to reduce bandwidth, typified by the Motion Picture Experts' Group (MPEG) series. However, compression may come at a cost of reduced fidelity. Compression based on ROI has the potential to reduce required bandwidth significantly. Compression based on ROI may be accomplished by transmitting the entire image on an occasional, perhaps periodic basis and transmitting only the ROI and its associated event when an event is detected. In one embodiment, assuming a ROI has 1/25 of the pixels of a frame, an event occurs every 30 frames (nominally one per second) and the reference frame is retransmitted once every 100 frames, a bandwidth reduction of roughly 99% results.

FIG. 12 presents the concept of ROI compression 130. The video, from an imaging system (e.g., the camera 102a in one embodiment) is processed to identify an event, the system 104 in one embodiment, and its associated ROI. One type of transmitter, a driver 136 in one embodiment, transmits a frame every n frames. When an event is detected, only the associated ROI with its reduced pixel count may be transmitted.

The illustrated embodiment of the system identifies an event, identifies the appearance of a true target in the field of an imaging system, highlights the location of the ROI that may be essentially centered on the true targets, provides an alert to the viewer/operator and enhances the image to facilitate recognition and identification. The system also includes a way to reject reoccurring false targets.

In general, the system identifies true targets by evaluating changes in the present frame n from a history of the same scene that includes both the average and the peak of each pixel. Several operations are performed to produce this identification. Those skilled in the art will recognize that some applications may not require some of the operations to be performed.

Figure 13:
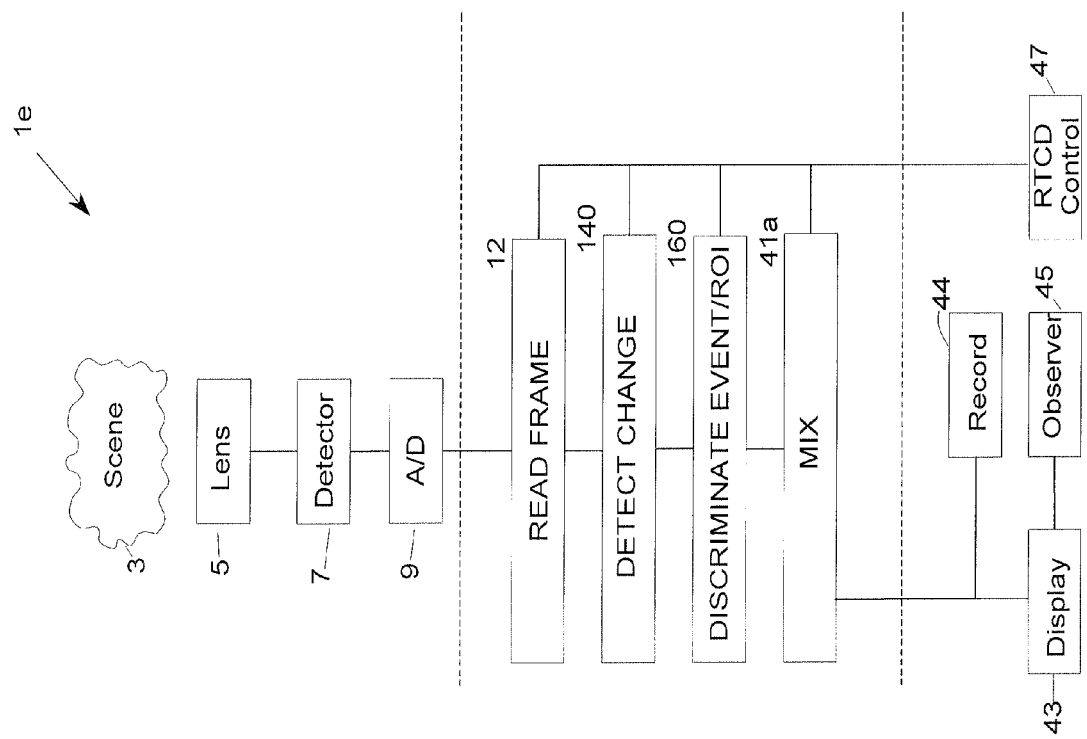
FIG. 13 illustrates various functions of a software-based embodiment of the system of FIG. 9.

FIG. 13 presents the function of the system in the software embodiment 1e. The incoming video stream from an analog-to-digital (A/D) converter 9 may be read frame by frame 12 and stored for processing. In one embodiment only every k=5 frames are read, where k can vary from 1 to n. The frame 12 may be processed by the change detection element 140 and passed to the event discrimination element 160. The illustrated embodiment of the event discrimination element 160 tests each event to identify if it is a true target or a false target (an event that is not of interest). The coordinates of the event are identified and a ROI, surrounding the event is established. The ROI can be of any geometric shape but may be circular in one embodiment.

The ROI may be highlighted and reproduced in a magnified image. In one embodiment the ROI is highlighted with a red dashed ring, and the magnified image is placed in a display quadrant different from the quadrant in which the true target is located. The ROI can be highlighted by a plurality of way including outlining or increasing the contrast or intensity of the ROI or decreasing the brightness of the remainder of the scene. The highlighted and magnified ROI are mixed 41 with the present frame and displayed 43 or recorded 44 for an observer 45.

The system control 47 may include both semi-fixed settings and settings the operator may change in response to the conditions present in the scene.

Figure 14A:
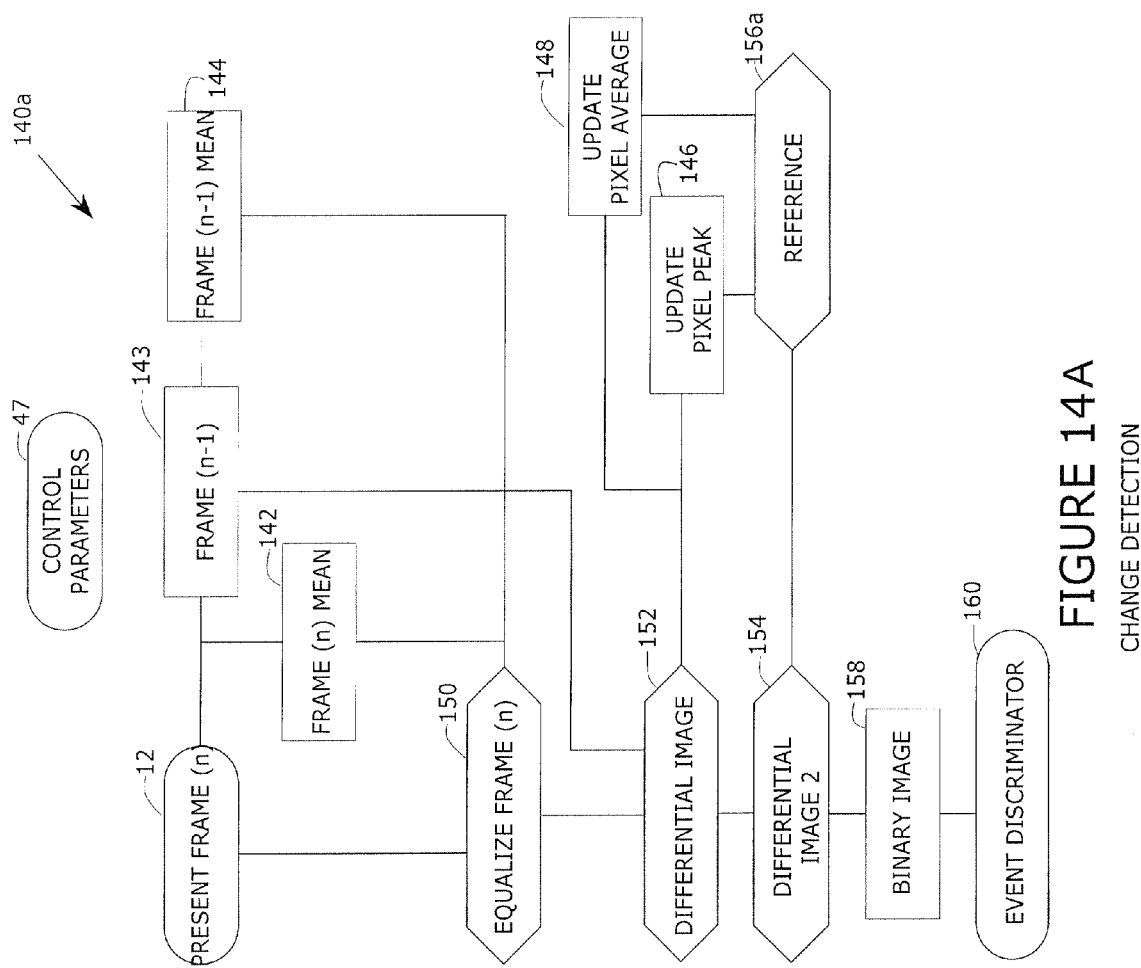
FIGS. 14A and 14B respectively illustrate block diagrams of one embodiment of a first event detector and a corresponding functional diagram of the first event detector.
Figure 14B:
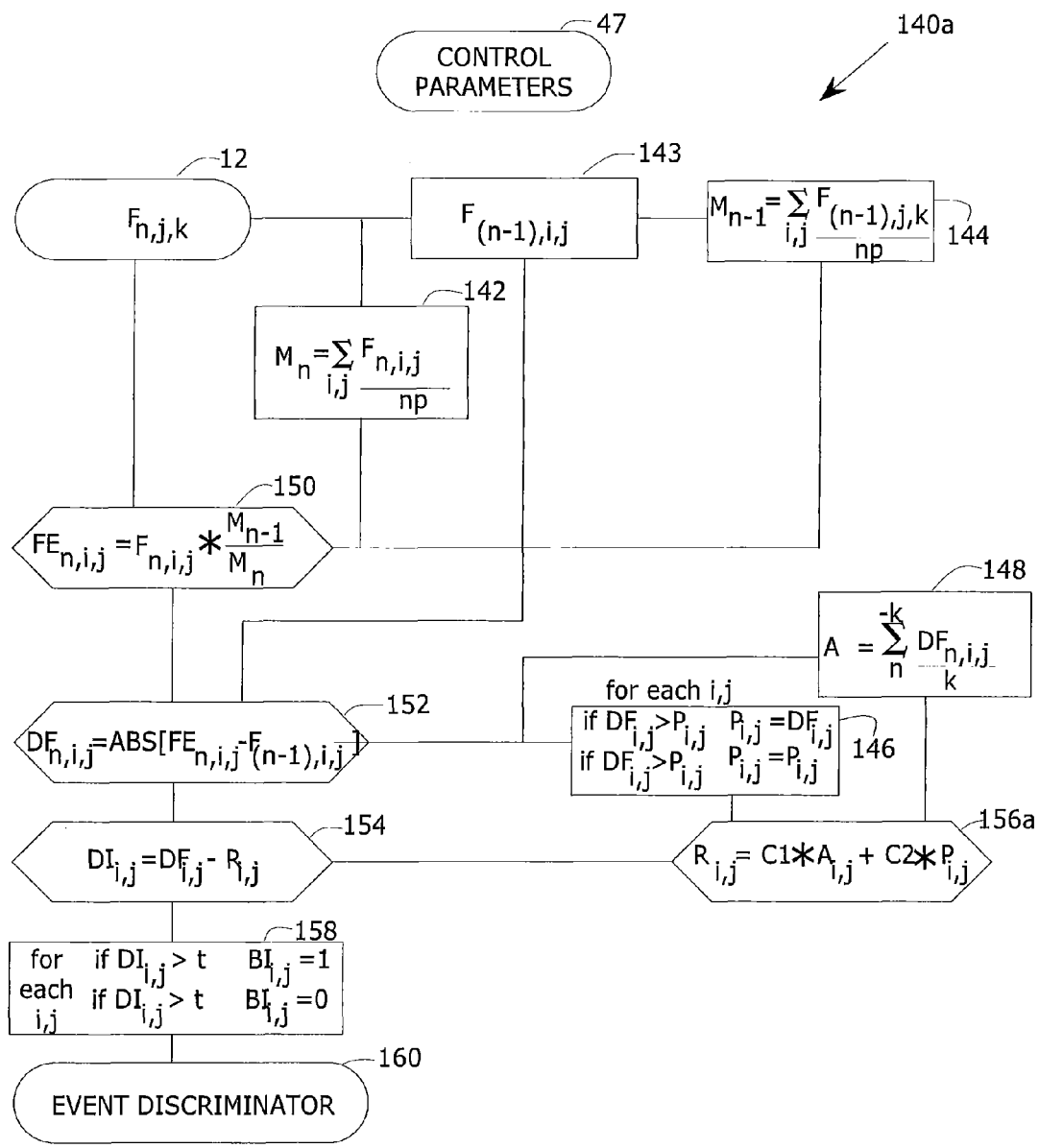

The first event detector 140a is shown in FIG. 14. The control parameters 47 which vary to optimize the performance are based on specific operational environments. The incoming video present frame 12 is read frame by frame. Each frame 12 in sequence. It is often desirable to read every $k^{th}$ frame, where k is a value from 1 to n. The output of the read function, the present frame 12 may be passed to a register which stores it for use as the previous frame n−1 143 after the present frame n12 has been processed. The present frame 12 may be processed to determine the mean value of the frame 142. It may be also processed to equalize the frame 150. The mean frame process 142, 143 may determine the average value of all pixels in the frame. This value represents a constant that may be proportional to the illumination and any gain adjustments. The two mean values are combined and multiplied with the values of the present frame 150 to compensate for any variation in the illumination. The output of the equalized frame 150 can be expressed as FE=[present frame Fn]*[previous frame Fn−1 mean Mn−1/present frame Fn mean Mn]. In some environments compensation for variation in illumination may not be required and frame equalization 150 may not be executed.

The equalized frame FE 150 and the previous frame Fn−1 143 are passed to the differential image 152. The previous frame Fn−1 143 may be subtracted from the present frame Fn, on a pixel by pixel basis and converted to an absolute value of the difference between the two frames. The output DF of the differential image 152 can be expressed as DF=abs[Fn−Fn−1]. This results in a pixel image of the difference. The difference image may be passed to the second differential image DI 154 and to the pixel peak update P 146 and the pixel average update A 148.

Two frames of data pixel peak P 146 and pixel average A 148 may be maintained for use in the reference R. These are updated with the previous frame Fn−1 information on a frame by frame basis. (They could be updated with the present frame which would only cause a negligible degradation.) The pixel average maintains a running frame average of each individual pixel. The pixel peak maintains a running image pixel array of the peak values encountered on each pixel for the last k frames.

The previous frame Fn−1 143 may be used to update the pixel average A 148 and pixel peak P 146 and the mean of frame Fn−1 may be derived prior to replacing frame Fn−1 with the next frame for use in processing the present frame.

The reference R156 may be a combination of the pixel by pixel values stored for both the pixel peaks P 146 and pixel average A 148. The reference can be represented by: R 156=C1*A 148+C2*P 146. In one embodiment, 0<C1<1.5, nominally 1.2, and 0.4>C2>6.0, nominally 4.0.

Those skilled in the art will recognize that the constants C1 and C2 may be selected as a function of the conditions present in the scene and can take on any value.

The second differential image DI 154 subtracts the reference R 156 from the delta frame DF 152 resulting in a second differential image DI 154 that represents the difference between the delta frame DF 152 and the reference R 156. When this image may be passed through the binary image BI 158 it results in a black and white binary image of those values in the image that are the difference between frame Fn and frame Fn−1 that are greater than the reference R 156.

The binary image BI 158 may then be passed to the true target discriminator 160.

Figure 15:
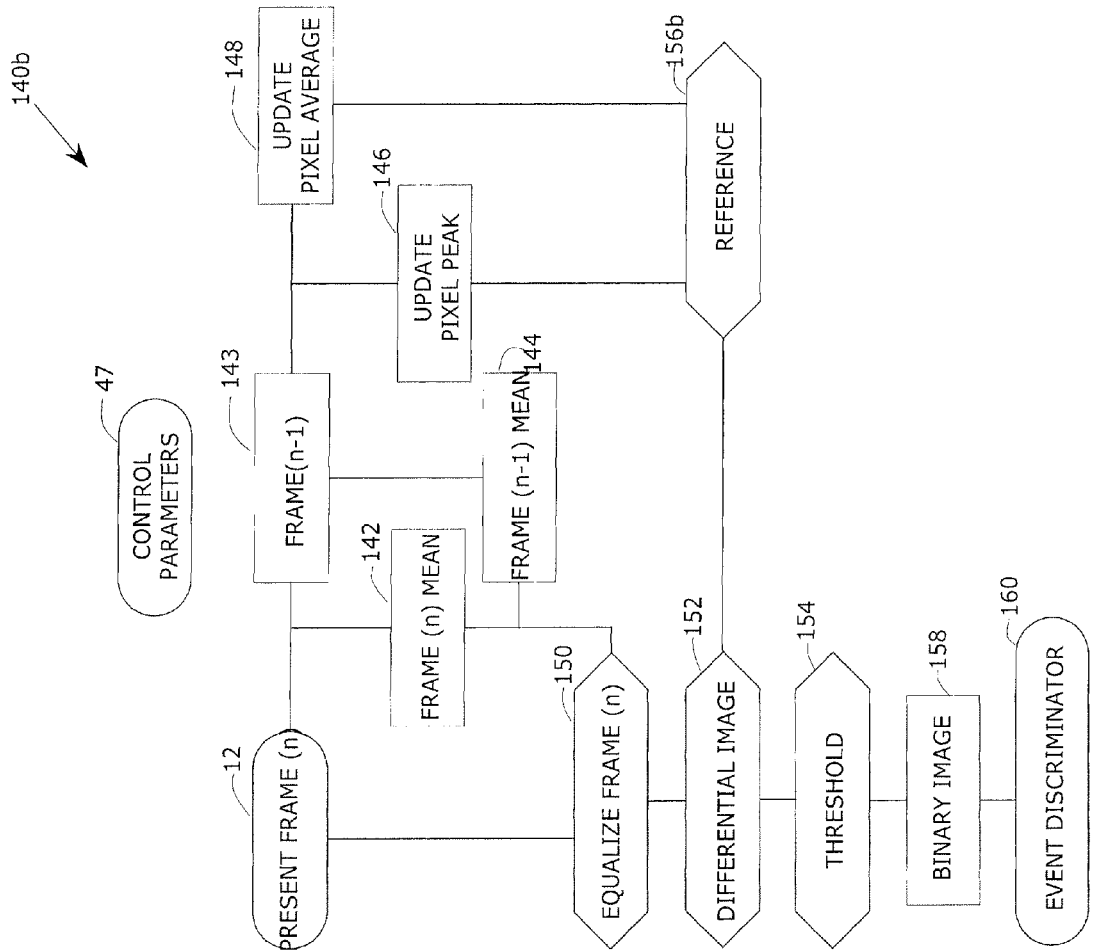
FIG. 15 illustrates a block diagram of another embodiment of a first event detector.

A second way 140b for detecting the change in the frame is presented in FIG. 15. This function is identical to the first way 140a with the exception that the differential image, DF 152 may be the difference between the present frame Fn 12 and the reference, R 156b. Reference 156 may be developed by the same method described previously. In this case the threshold 154 results in a differential image 158 of those values in frame n that are greater than the reference 156b.

Figure 16:
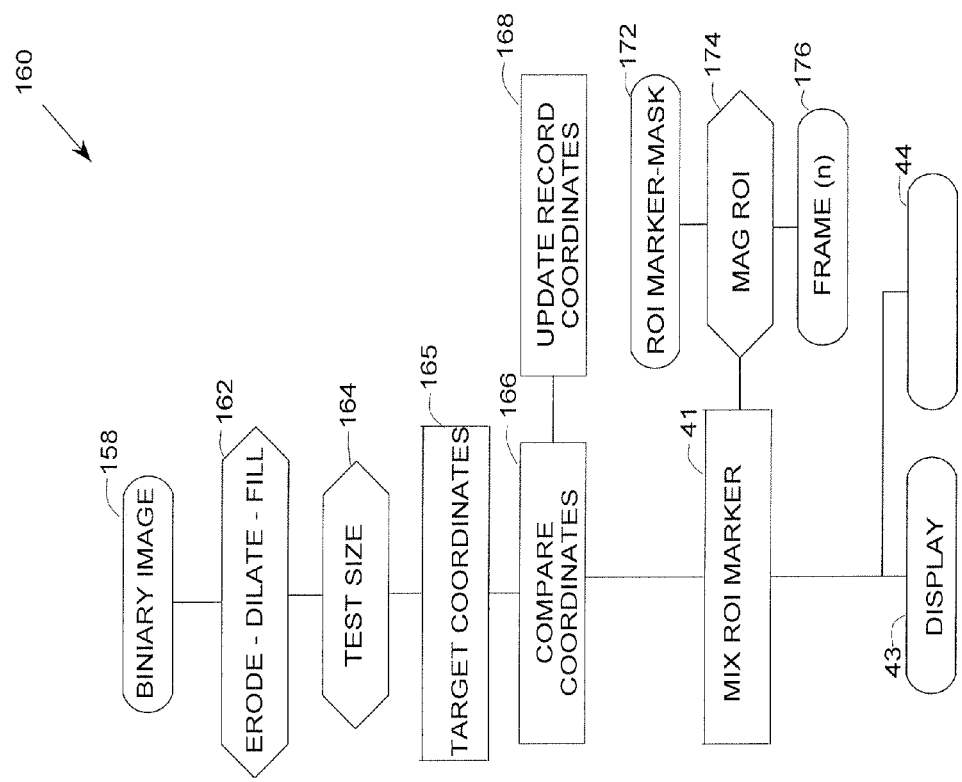
FIG. 16 illustrates a block diagram of a true target discriminator.

The true target discriminator 160 is presented in FIG. 16. The binary image 158 may be treated with "morphological processing" as defined in "Digital Image Processing, Second Edition," Rafael C. Gonzalez & Richard E. Woods. In one embodiment this embodies eroding, dilating and filling the binary image 156. The shape and size of the structuring elements are a function of both the scene and the intended true target. It is recognized that for some scenes and or true targets this process may not be required.

The objects in the resulting binary image are tested for size 164. Where minimum size>object>maximum size. The minimum and maximum sizes are set based on the anticipated true target and the particular scene.

The true target coordinates 165 are determined for each object that meets the size criteria. These coordinates are compared to the coordinates of previously detected true targets. The system has the option of rejecting true targets with the same coordinates of previously identified true target coordinates.

The true target coordinates 165 are passed to the ROI marker. A ROI is defined and in one embodiment a ROI marker mask 172 may be added to the original image, frame n. The ROI can be highlighted in a multitude of techniques. The ROI can be highlighted, outlined, colored or encircled with a variety of shapes. The system has a magnify option in which the ROI may be magnified and overlaid in a different portion of the image. In one embodiment it may be the opposing quadrant from the true target.

The image of the original frame n 12 may be displayed 43 or stored 44 with both the highlighted and magnified image.

Although the invention has been described in detail, those skilled in the pertinent art should understand that they can make various changes, substitutions and alterations herein without departing from the scope of the invention in its broadest form.

What is claimed is:

1. A system for displaying a plurality of images, comprising:
   an event detector configured to detect at least one true target in said plurality of images using a threshold based on average and peak pixel values by subtracting a reference image from a present image on a pixel by pixel basis, the reference image based on a weighted sum of an average and peak value from previous frames;
   an image processor configured to define at least one corresponding region-of-interest for said at least one true target;
   at least one display configured to display said plurality of images on at least one display; and
   a region-of-interest display separate from said at least one display and configured to display said at least one region-of-interest.

2. The system as recited in claim 1 wherein said at least one display is a plurality of displays configured to display corresponding ones of said plurality of images.

3. The system as recited in claim 1 wherein said at least one display is a single display configured to display said plurality of images in portions thereof 4. The system as recited in claim 1 wherein said at least one display is a single display configured to sequentially display said plurality of images.

5. The system as recited in claim 1 wherein said plurality of images are scaled before detection and wherein said at least one region-of-interest is mixed with at least one corresponding unscaled image before display.

6. The system as recited in claim 1 wherein said at least one display periodically receives a reference frame and said region-of-interest display receives said at least one region-of-interest upon detection of said true target.

7. The system as recited in claim 1 wherein an image processing system contains said image processor.

8. The system as recited in claim 1 wherein said image processing system compares a frame change with a reference frame.

9. The system as recited in claim 1 wherein said plurality of images originates in an imaging system.

10. The system as recited in claim 9 wherein said imaging system comprises a camera.

11. A method of displaying a plurality of images, comprising:
    detecting at least one true target in said plurality of images using a threshold based on average and peak pixel values by subtracting a reference image from a present image on a pixel by pixel basis, the reference image based on a weighted sum of an average and peak value from previous frames;
    defining at least one corresponding region-of-interest for said at least one true target; and
    displaying said plurality of images on at least one display and said at least one region-of-interest on a region-of-interest display separate from said at least one display.

12. The method as recited in claim 11 wherein said displaying comprises displaying said plurality of images on a corresponding plurality of displays and said region-of-interest display is separate from said plurality of displays.

13. The method as recited in claim 11 wherein said displaying comprises displaying said plurality of images in portions of a single display.

14. The method as recited in claim 11 wherein said displaying comprises sequentially displaying said plurality of images on a single display.

15. The method as recited in claim 11 further comprising scaling said plurality of images before said detecting and wherein said displaying comprises mixing said at least one region-of-interest with at least one corresponding unscaled image.

16. The method as recited in claim 11 wherein said displaying said plurality of images comprises periodically transmitting a reference frame and said displaying said at least one region-of-interest is carried out upon detection of said true target.

17. The method as recited in claim 11 wherein an image processing system carries out said defining.

18. The method as recited in claim 11 wherein said image processing system compares a frame change with a reference frame.

19. The method as recited in claim 11 wherein said plurality of images originates in an imaging system.

20. The method as recited in claim 19 wherein said imaging system comprises a camera.

* * * * *